(12) United States Patent
Sun et al.

(10) Patent No.: US 9,212,099 B2
(45) Date of Patent: *Dec. 15, 2015

(54) HEAT TREATED CERAMIC SUBSTRATE HAVING CERAMIC COATING AND HEAT TREATMENT FOR COATED CERAMICS

(71) Applicant: Applied Materials, Inc., Santa Clara, CA (US)

(72) Inventors: Jennifer Y. Sun, Mountain View, CA (US); Ren-Guan Duan, Fremont, CA (US); Biraja P. Kanungo, San Jose, CA (US); Dmitry Lubomirsky, Cupertino, CA (US)

(73) Assignee: Applied Materials, Inc., Santa Clara, CA (US)

( * ) Notice: Subject to any disclaimer, the term of this patent is extended or adjusted under 35 U.S.C. 154(b) by 99 days.

This patent is subject to a terminal disclaimer.

(21) Appl. No.: 13/745,589

(22) Filed: Jan. 18, 2013

(65) Prior Publication Data

US 2013/0216821 A1  Aug. 22, 2013

Related U.S. Application Data

(60) Provisional application No. 61/602,020, filed on Feb. 22, 2012, provisional application No. 61/619,854, filed on Apr. 3, 2012.

(51) Int. Cl.
*C04B 41/00* (2006.01)
*C04B 41/80* (2006.01)
(Continued)

(52) U.S. Cl.
CPC .......... *C04B 41/0072* (2013.01); *C04B 41/009* (2013.01); *C04B 41/52* (2013.01); *C04B 41/80* (2013.01); *C04B 41/89* (2013.01); *Y10T 428/249988* (2015.04); *Y10T 428/265* (2015.01)

(58) Field of Classification Search
CPC .................................................. C04B 41/0072
USPC ...................................................... 427/376.2
See application file for complete search history.

(56) References Cited

U.S. PATENT DOCUMENTS 3,796,182 A  3/1974  Rosler
4,399,199 A  8/1983  McGill
(Continued)

FOREIGN PATENT DOCUMENTS

DE  03/01654  6/2003
EP  0330196 B1  8/1989
(Continued)

OTHER PUBLICATIONS

Tania Bhatia et al., "Mechanisms of ceramic coating deposition in solution-precurosr plasma spray," J.Mater. Res., vol. 17, No. 9, Sep. 2002, 10 pages, Materials Research Society, Warrendale, PA, USA.
(Continued)

*Primary Examiner* — Nathan Empie
(74) *Attorney, Agent, or Firm* — Lowenstein Sandler LLP

(57) ABSTRACT

A ceramic article having a ceramic substrate and a ceramic coating with an initial porosity and an initial amount of cracking is provided. The ceramic article is heated to a temperature range between about 1000° C. and about 1800° C. at a ramping rate of about 0.1° C. per minute to about 20° C. per minute. The ceramic article is heat treated at one or more temperatures within the temperature range for a duration of up to about 24 hours. The ceramic article is then cooled at the ramping rate, wherein after the heat treatment the ceramic coating has a reduced porosity and a reduced amount of cracking.

15 Claims, 10 Drawing Sheets

(51) Int. Cl.
*C04B 41/89* (2006.01)
*C04B 41/52* (2006.01)

(56) References Cited

U.S. PATENT DOCUMENTS

| | | | |
|---|---|---|---|
| 4,439,248 A | 3/1984 | Herchenroeder et al. | |
| 4,642,440 A | 2/1987 | Schnackel et al. | |
| 4,704,299 A | 11/1987 | Wielonski et al. | |
| 4,880,614 A | 11/1989 | Strangman et al. | |
| 5,381,944 A | 1/1995 | Makowiecki et al. | |
| 5,415,756 A | 5/1995 | Wolfe et al. | |
| 5,626,923 A | 5/1997 | Fitzgibbons et al. | |
| 5,631,803 A | 5/1997 | Cameron et al. | |
| 5,687,679 A | 11/1997 | Mullin et al. | |
| 5,766,693 A | 6/1998 | Rao | |
| 5,800,871 A | 9/1998 | Collins et al. | |
| 5,837,058 A | 11/1998 | Chen et al. | |
| 5,853,815 A | 12/1998 | Muehlberger | |
| 5,916,689 A | 6/1999 | Collins et al. | |
| 6,106,959 A | 8/2000 | Vance et al. | |
| 6,194,083 B1 | 2/2001 | Yasuda et al. | |
| 6,245,202 B1 | 6/2001 | Edamura et al. | |
| 6,361,645 B1 | 3/2002 | Schoepp et al. | |
| 6,506,254 B1 | 1/2003 | Bosch et al. | |
| 6,530,990 B2 | 3/2003 | Kong et al. | |
| 6,534,194 B2 | 3/2003 | Weihs et al. | |
| 6,581,275 B2 | 6/2003 | Narendrnath et al. | |
| 6,616,031 B2 | 9/2003 | Wong et al. | |
| 6,783,875 B2 | 8/2004 | Yamada et al. | |
| 6,794,059 B2 | 9/2004 | Shanker | |
| 6,805,952 B2 | 10/2004 | Chang et al. | |
| 6,933,254 B2 | 8/2005 | Morita et al. | |
| 6,942,929 B2 | 9/2005 | Han et al. | |
| 7,300,537 B2 | 11/2007 | O'Donnell et al. | |
| 7,351,482 B2 | 4/2008 | Boutwell et al. | |
| 7,441,688 B2 | 10/2008 | Van Heerden et al. | |
| 7,507,268 B2 | 3/2009 | Rosenflanz | |
| 7,510,641 B2 | 3/2009 | Kreiskott et al. | |
| 7,615,133 B2 | 11/2009 | Tateno et al. | |
| 7,648,782 B2 | 1/2010 | Kobayashi et al. | |
| 7,649,729 B2 | 1/2010 | Buchberger, Jr. et al. | |
| 7,690,308 B2 | 4/2010 | Nielson et al. | |
| 7,696,117 B2 | 4/2010 | Sun et al. | |
| 7,810,704 B2 | 10/2010 | Duckham et al. | |
| 7,964,517 B2 | 6/2011 | Jaiswal | |
| 8,034,734 B2 | 10/2011 | Sun et al. | |
| 8,206,829 B2 | 6/2012 | Sun et al. | |
| 8,367,227 B2 | 2/2013 | Sun et al. | |
| 8,404,572 B2 | 3/2013 | Chang et al. | |
| 2001/0003271 A1 | 6/2001 | Otsuki | |
| 2002/0018921 A1* | 2/2002 | Yamada et al. | 428/697 |
| 2002/0086119 A1 | 7/2002 | Hariharan et al. | |
| 2002/0100424 A1 | 8/2002 | Sun et al. | |
| 2003/0007308 A1 | 1/2003 | Harada et al. | |
| 2003/0047802 A1 | 3/2003 | Hiramatsu et al. | |
| 2003/0159657 A1 | 8/2003 | Kaushal et al. | |
| 2003/0185965 A1 | 10/2003 | Lin et al. | |
| 2003/0232139 A1 | 12/2003 | DeTura | |
| 2004/0009297 A1 | 1/2004 | Fusaro, Jr. et al. | |
| 2004/0033385 A1 | 2/2004 | Kaushal et al. | |
| 2004/0110016 A1 | 6/2004 | Hamaya et al. | |
| 2004/0266216 A1 | 12/2004 | Li et al. | |
| 2005/0037193 A1 | 2/2005 | Sun et al. | |
| 2005/0042876 A1 | 2/2005 | Kobayashi et al. | |
| 2005/0056056 A1 | 3/2005 | Wong | |
| 2005/0084654 A1 | 4/2005 | Takahashi et al. | |
| 2005/0153069 A1 | 7/2005 | Tapphorn et al. | |
| 2005/0266682 A1 | 12/2005 | Chen et al. | |
| 2006/0068189 A1 | 3/2006 | Raybould et al. | |
| 2006/0096703 A1 | 5/2006 | Moriya et al. | |
| 2006/0164785 A1 | 7/2006 | Pellegrin | |
| 2006/0222777 A1 | 10/2006 | Skoog et al. | |
| 2007/0006561 A1 | 1/2007 | Brady et al. | |
| 2007/0110915 A1 | 5/2007 | Kitamura et al. | |
| 2007/0169891 A1 | 7/2007 | Koshiishi et al. | |
| 2007/0212567 A1 | 9/2007 | Esaki et al. | |
| 2007/0218302 A1 | 9/2007 | Kobayashi et al. | |
| 2008/0016684 A1 | 1/2008 | Olechnowicz et al. | |
| 2008/0029032 A1 | 2/2008 | Sun et al. | |
| 2008/0090034 A1 | 4/2008 | Harrison et al. | |
| 2008/0099148 A1 | 5/2008 | Ryabova et al. | |
| 2008/0113218 A1 | 5/2008 | Schlichting et al. | |
| 2008/0169588 A1 | 7/2008 | Shih et al. | |
| 2008/0174930 A1 | 7/2008 | Hattori et al. | |
| 2008/0213496 A1 | 9/2008 | Sun et al. | |
| 2008/0223725 A1 | 9/2008 | Han et al. | |
| 2008/0241412 A1 | 10/2008 | Inaki et al. | |
| 2008/0264564 A1 | 10/2008 | Sun et al. | |
| 2008/0264565 A1 | 10/2008 | Sun et al. | |
| 2008/0268171 A1 | 10/2008 | Ma et al. | |
| 2008/0268645 A1 | 10/2008 | Kao et al. | |
| 2009/0034147 A1 | 2/2009 | Narendrnath et al. | |
| 2009/0034148 A1 | 2/2009 | Lubomirsky et al. | |
| 2009/0034149 A1 | 2/2009 | Lubomirsky et al. | |
| 2009/0036292 A1 | 2/2009 | Sun et al. | |
| 2009/0075486 A1 | 3/2009 | Kikuyama et al. | |
| 2009/0133713 A1 | 5/2009 | Ohmi et al. | |
| 2009/0214825 A1 | 8/2009 | Sun et al. | |
| 2009/0252945 A1 | 10/2009 | Refke et al. | |
| 2009/0284894 A1 | 11/2009 | Cooke | |
| 2009/0297718 A1* | 12/2009 | Sarrafi-Nour et al. | 427/377 |
| 2010/0048379 A1 | 2/2010 | Thippareddy et al. | |
| 2010/0053841 A1 | 3/2010 | Rusinko, Jr. et al. | |
| 2010/0112192 A1 | 5/2010 | Li et al. | |
| 2010/0119843 A1 | 5/2010 | Sun et al. | |
| 2010/0160143 A1 | 6/2010 | Sun et al. | |
| 2010/0177454 A1 | 7/2010 | Elliot et al. | |
| 2010/0218472 A1 | 9/2010 | Iyer | |
| 2010/0272982 A1 | 10/2010 | Dickinson et al. | |
| 2010/0314356 A1 | 12/2010 | Nagayama et al. | |
| 2011/0049729 A1 | 3/2011 | Naundorf et al. | |
| 2011/0086178 A1 | 4/2011 | Ruud et al. | |
| 2011/0149462 A1 | 6/2011 | Kugimoto et al. | |
| 2011/0151237 A1 | 6/2011 | Nakano et al. | |
| 2011/0174441 A1 | 7/2011 | Yamashita et al. | |
| 2011/0198034 A1 | 8/2011 | Sun et al. | |
| 2011/0268877 A1 | 11/2011 | Dickson et al. | |
| 2011/0268956 A1 | 11/2011 | Altuna et al. | |
| 2011/0315081 A1 | 12/2011 | Law et al. | |
| 2012/0034469 A1 | 2/2012 | Sun et al. | |
| 2012/0040100 A1 | 2/2012 | Matias et al. | |
| 2012/0076574 A1 | 3/2012 | Parke | |
| 2012/0100299 A1 | 4/2012 | Zajchowski et al. | |
| 2012/0100300 A1 | 4/2012 | Gindrat et al. | |
| 2012/0104703 A1 | 5/2012 | Sun et al. | |
| 2012/0299253 A1 | 11/2012 | Kosakai et al. | |
| 2012/0307412 A1 | 12/2012 | Boyd, Jr. et al. | |
| 2013/0019797 A1 | 1/2013 | Tanaka et al. | |
| 2013/0026720 A1 | 1/2013 | Hori et al. | |
| 2013/0174983 A1 | 7/2013 | Kikuchi et al. | |
| 2013/0216783 A1 | 8/2013 | Sun et al. | |
| 2013/0216821 A1 | 8/2013 | Sun et al. | |
| 2013/0224675 A1 | 8/2013 | Park | |
| 2013/0273313 A1 | 10/2013 | Sun et al. | |
| 2013/0273327 A1 | 10/2013 | Sun et al. | |
| 2013/0284373 A1 | 10/2013 | Sun et al. | |
| 2013/0288037 A1 | 10/2013 | Sun et al. | |
| 2014/0030486 A1 | 1/2014 | Sun et al. | |
| 2014/0030533 A1 | 1/2014 | Sun et al. | |

FOREIGN PATENT DOCUMENTS

| | | |
|---|---|---|
| JP | 2002-087878 | 3/2002 |
| JP | 2005-279481 | 10/2005 |
| JP | 2006-027012 | 8/2006 |
| JP | 2007-191794 | 8/2007 |
| JP | 2009-536732 | 10/2009 |
| JP | 2010-106327 | 5/2010 |
| JP | 2010-229492 | 10/2010 |
| JP | 2013-124378 | 6/2013 |
| KR | 10-2003-0025007 | 3/2003 |
| KR | 10-2007-0013118 | 1/2007 |
| KR | 10-2011-0028378 | 3/2011 |
| KR | 10-2011-0117845 | 10/2011 |

(56) References Cited

FOREIGN PATENT DOCUMENTS

| WO | WO 01/24581 | 4/2001 |
|----|-------------|--------|
| WO | WO 02/00968 | 1/2002 |
| WO | WO 2003/100843 | 12/2003 |
| WO | WO 2013/126466 | 8/2013 |
| WO | WO 2013/155220 | 10/2013 |
| WO | WO 2013/162909 | 10/2013 |
| WO | WO 2014/018830 | 1/2014 |
| WO | WO 2014/018835 | 1/2014 |

OTHER PUBLICATIONS

Ulrike Taffner et al., "Preparation and Microstructural Analysis of High-Performance Ceramics," ASM Handbook vol. 9: Metallography and Microstructures, 2004, 11 pages, ASM International, Materials Park, Ohio, USA.

Haas et al., "Gas jet assisted vapor deposition of yttria stabilized zirconia," Department of Materials Science and Engineering, School of Engineering and Applied Science, published Feb. 27, 2009 University of Virginia, Charlottesville, Virginia 22903.

Di Girolamo et al., "Microstructure and thermal properties of plasma-sprayed ceramic thermal barrier coatings," Energia, Ambiente e Innovazione, Published Jan. 2, 2013.

Bergant et al., "Porosity evaluation of flame-sprayed and heat-treated coatings using image analysis," Image Anal Stereol 2011; 30:53-62, Published Jan. 27, 2011.

Smith et al., "Very Low Pressure Plasma Spray—A Review of an Emerging Technology in the Thermal Spray Community," Coatings 2011, 1, 117-132, doi: 10.3390/coatings1020117, Published Dec. 20, 2011.

International Search Report & Written Opinion of the International Searching Authority dated Apr. 25, 2013, in International Application No. PCT/US2013/026963.

Zircotec—Plasma sprayed ceramic thermal coatings, http://www.zircotec.com/p./plasma-sprayprocessing/39, downloaded Apr. 4, 2014.

Nakamura et al., "Effects of Pores on Mechanical Properties of Plasma-Sprayed Ceramic Coatings," J. Am. Ceram. Soc., 83 [3] 578-84, Mar. 2000.

Govidarajan et al., "In situ Particle Generation and Splat Formation During Solution Precursor Plasma Spraying of Yttria-Stabilized Zirconia Coatings," J Am. Ceram. Soc., 1-9 (2011).

"Thermal Spraying," definition, Wikipedia, http://en.wikipedia.org/wiki/Thermal—spraying, downloaded Apr. 14, 2014.

U.S. Appl. No. 13/659,813, Non-Final Office Action mailed Oct. 21, 2013.

Kitamura et al., "Structural, Mechanical and Erosion Properties of Yttrium Oxide Coatings by Axial Suspension Plasma Spraying for Electronics Applications," Journal of Thermal Spray Technology, 20:170-185, Jan. 2011.

U.S. Appl. No. 13/659,813, Final Office Action mailed Mar. 26, 2014.

Non-Final Office Action mailed Sep. 11, 2014 in U.S. Appl. No. 13/659,813.

Notice of Allowance mailed Jan. 15, 2015 in U.S. Appl. No. 13/659,813.

\* cited by examiner

US 9,212,099 B2

HEAT TREATED CERAMIC SUBSTRATE HAVING CERAMIC COATING AND HEAT TREATMENT FOR COATED CERAMICS

RELATED APPLICATIONS

This patent application claims the benefit under 35 U.S.C. §119(e) of U.S. Provisional Application No. 61/602,020, filed Feb. 22, 2012 and of U.S. Provisional Application No. 61/619,854, filed Apr. 3, 2012.

TECHNICAL FIELD

Embodiments of the present invention relate, in general, to a heat treatment process used to heat treat coated ceramic articles.

BACKGROUND

In the semiconductor industry, devices are fabricated by a number of manufacturing processes producing structures of an ever-decreasing size. Some manufacturing processes such as plasma etch and plasma clean processes expose a substrate to a high-speed stream of plasma to etch or clean the substrate. The plasma may be highly corrosive, and may corrode processing chambers and other surfaces that are exposed to the plasma. This corrosion may generate particles, which frequently contaminate the substrate that is being processed, contributing to device defects.

As device geometries shrink, susceptibility to defects increases, and particle contaminant requirements become more stringent. Accordingly, as device geometries shrink, allowable levels of particle contamination may be reduced. To minimize particle contamination introduced by plasma etch and/or plasma clean processes, chamber materials have been developed that are resistant to plasmas. Examples of such plasma resistant materials include ceramics composed of $Al_2O_3$, AlN, SiC, $Y_2O_3$, quartz, and ZrO2. However, the plasma resistance properties of these ceramic materials may be insufficient for some applications. For example, plasma resistant ceramic lids and/or nozzles that are manufactured using traditional ceramic manufacturing processes may produce unacceptable levels of particle contamination when used in plasma etch processes of semiconductor devices with critical dimensions of 45 nm or 32 nm Additionally, when such plasma resistant ceramics are used as ceramic coatings, these coatings may cause elevated levels of particle contamination and may fail due to delamination.

SUMMARY

In one embodiment, a ceramic article having a ceramic substrate and a ceramic coating with an initial porosity and an initial amount of cracking is provided. The ceramic article is heated to a temperature range between about 1000° C. and about 1800° C. at a ramping rate of about 0.1° C. per minute to about 20° C. per minute. The ceramic article is heat treated at one or more temperatures within the temperature range for a duration of up to about 24 hours. The ceramic article is then cooled at the ramping rate, wherein after the heat treatment the ceramic coating has a and reduced porosity and a reduced amount of cracking.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION OF EMBODIMENTS

Figure 1A:
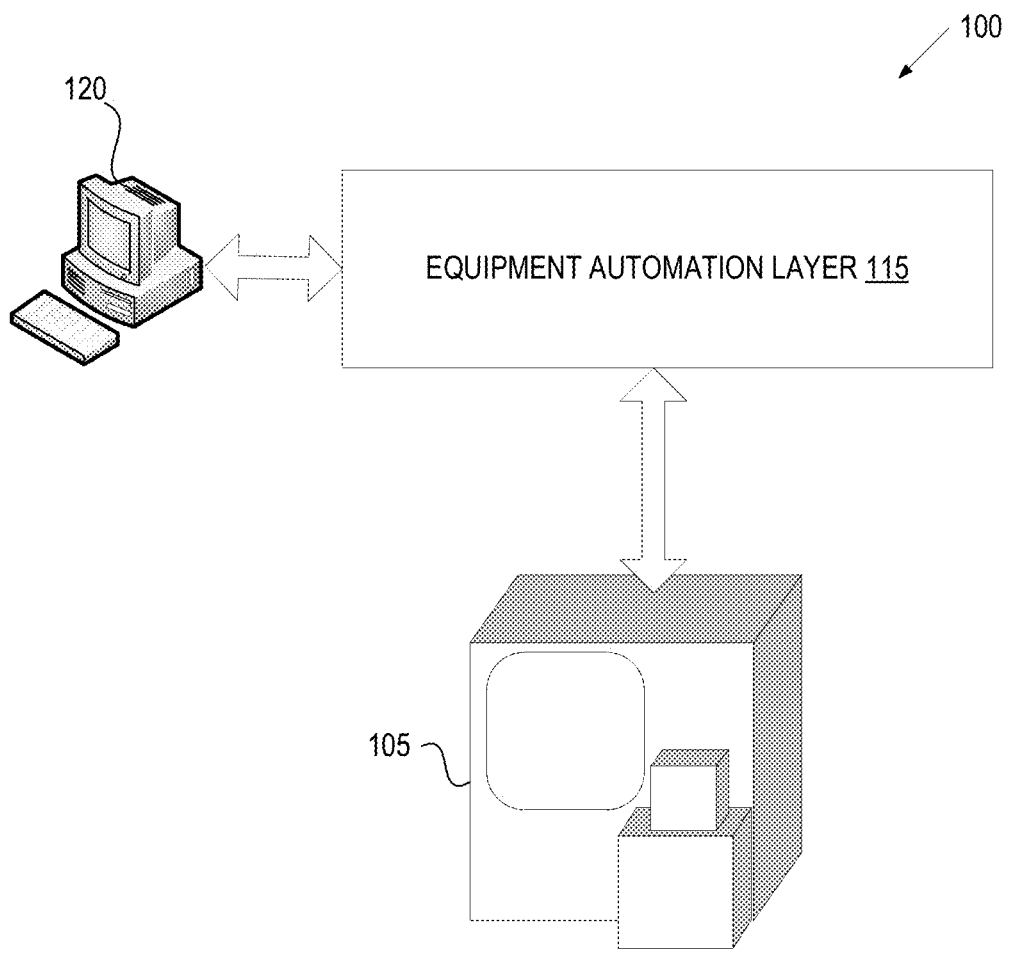
FIG. 1A illustrates an exemplary architecture of a manufacturing system, in accordance with one embodiment of the present invention.

Embodiments of the invention are directed to a process for heat treating a ceramic article, and to a ceramic article processed using the heat treatment. In one embodiment, a ceramic article including a ceramic substrate and a ceramic coating having an initial porosity, an initial bond strength to the ceramic substrate and an initial amount of cracking is provided. The ceramic substrate may be a sintered ceramic, and the ceramic coating may be a plasma sprayed ceramic. The ceramic article may be, for example, a ceramic lid, nozzle or process kit for a plasma etcher. The ceramic article is heated to a temperature range between about 1000° C. and about 1800° C. at a ramping rate of about 0.1° C. per minute to about 20° C. per minute. The ceramic article is heat treated at one or more temperatures within the temperature range for a duration of up to about 24 hours. The ceramic article is then cooled at the ramping rate. After the heat treatment, the ceramic coating has reduced surface defects, a reduced coating porosity and a reduced amount of cracking. The ceramic coating may also have a reduced surface roughness, and may additionally have a greater resistance to plasma. Additionally, after the heat treatment, the ceramic coating may have a stronger interface to the ceramic substrate, which may provide a greater adhesion strength to the ceramic substrate. The stronger interface may be due to the formation of a transition layer between the ceramic substrate and the ceramic coating.

In one embodiment, a furnace performs a heat treatment process on a ceramic article including a ceramic substrate and a ceramic coating having an initial porosity and an initial amount of cracking. The furnace heats the ceramic article at a ramping rate of about 0.1° C. per minute to about 20° C. per minute until the ceramic article reaches a specified temperature or temperature range. The specified temperature range may vary from about 1000° C. to about 1800° C., and the specified temperature may be a temperature within the specified temperature range. The furnace heat treats the ceramic article at the specified temperature and/or other specified temperatures within the temperature range for a duration of up to about 24 hours. The furnace then cools the ceramic article at the ramping rate. After the heat treatment, the ceramic article has a reduced surface porosity and a reduced amount of cracking.

Embodiments of the invention increase the strength of a bond between the ceramic coating and the ceramic substrate that it coats through a formation of transition layer. Embodiments of the invention also reduce the surface defects, reduce the porosity and reduce the amount of cracking of a ceramic coating on a processed ceramic article. Embodiments may also reduce the surface roughness of processed ceramic coatings, and minimize surface particles on the ceramic coatings. Such heat treated ceramic coatings have a reduced number of high energy bonds (broken bonds), and may produce a significantly lower amount of particle contamination when used in semiconductor processes that apply plasmas (e.g., plasma etch and plasma clean processes). Additionally, the reduced porosity and reduced cracking of the heat treated ceramic coating reduces an amount of process gas that penetrates the ceramic coating to react with an underlying substrate. Additionally, the formation of a transition layer (also referred to herein as an interfacial transition layer) between the ceramic coating and ceramic substrate prohibits the reaction of process chemistry that penetrates the coating with an underlying substrate. This may minimize the occurrence of delamination. The transition layer may increase adhesion strength of the ceramic coating, and may minimize peeling. For example, ceramic coated lids and nozzles for etcher machines may be heat treated to minimize particle contamination and/or peeling introduced during plasma etch processes. Thus, semiconductors manufactured using the heat treated ceramic articles described herein may have a lower defect count and may result in reduced scrap rates.

The term "heat treating" is used herein to mean applying an elevated temperature to a ceramic article, such as by a furnace. When the term "about" is used herein, this is intended to mean that the nominal value presented is precise within ±10%.

Some embodiments are described herein with reference to using a furnace to perform a heat treatment. However, it should be understood that other heat treatment techniques may also be used to perform the described heat treatment. Some examples of additional heat treatment techniques that may be used include a laser surface treatment (also referred to as laser heat treatment), an electron beam (e-beam) surface treatment (also referred to as e-beam heat treatment), a flame surface treatment (also referred to as a flame heat treatment), and a high temperature plasma treatment.

Note also that some embodiments are described herein with reference to ceramic coated lids and ceramic coated nozzles used in plasma etchers for semiconductor manufacturing. However, it should be understood that such plasma etchers may also be used to manufacture micro-electro-mechanical systems (MEMS)) devices. Additionally, the heat treated ceramic articles described herein may be other structures that are exposed to plasma. For example, the ceramic articles may be ceramic coated rings, walls, bases, gas distribution plates, shower heads, substrate holding frames, etc. of a plasma etcher, a plasma cleaner, a plasma propulsion system, and so forth.

Moreover, embodiments are described herein with reference to ceramic articles that cause reduced particle contamination when used in a process chamber for plasma rich processes. However, it should be understood that the ceramic articles discussed herein may also provide reduced particle contamination when used in process chambers for other processes such as non-plasma etchers, non-plasma cleaners, chemical vapor deposition (CVD) chambers physical vapor deposition (PVD) chambers, plasma enhanced chemical vapor deposition (PECVD) chambers, plasma enhanced physical vapor deposition (PEPVD) chambers, plasma enhanced atomic layer deposition (PEALD) chambers, and so forth.

FIG. 1A illustrates an exemplary architecture of a manufacturing system, in accordance with one embodiment of the present invention. The manufacturing system 100 may be a ceramics manufacturing system. In one embodiment, the manufacturing system 100 includes a furnace 105 (e.g., a ceramic furnace such as a kiln), an equipment automation layer 115 and a computing device 120. In alternative embodiments, the manufacturing system 100 may include more or fewer components. For example, the manufacturing system 100 may include only the furnace 105, which may be a manual off-line machine.

Furnace 105 is a machine designed to heat articles such as ceramic articles. Furnace 105 includes a thermally insulated chamber, or oven, capable of applying a controlled temperature on articles (e.g., ceramic articles) inserted therein. In one embodiment, the chamber is hermitically sealed. Furnace 105 may include a pump to pump air out of the chamber, and thus to create a vacuum within the chamber. Furnace 105 may additionally or alternatively include a gas inlet to pump gasses (e.g., inert gasses such as Ar or $N_2$) into the chamber.

Furnace 105 may be a manual furnace having a temperature controller that is manually set by a technician during processing of ceramic articles. Furnace 105 may also be an off-line machine that can be programmed with a process recipe. The process recipe may control ramp up rates, ramp down rates, process times, temperatures, pressure, gas flows, and so on. Alternatively, furnace 105 may be an on-line automated furnace that can receive process recipes from computing devices 120 such as personal computers, server machines, etc. via an equipment automation layer 115. The equipment automation layer 115 may interconnect the furnace 105 with computing devices 120, with other manufacturing machines, with metrology tools and/or other devices.

The equipment automation layer 115 may include a network (e.g., a location area network (LAN)), routers, gateways, servers, data stores, and so on. Furnace 105 may connect to the equipment automation layer 115 via a SEMI Equipment Communications Standard/Generic Equipment Model (SECS/GEM) interface, via an Ethernet interface, and/or via other interfaces. In one embodiment, the equipment automation layer 115 enables process data (e.g., data collected by furnace 105 during a process run) to be stored in a data store (not shown). In an alternative embodiment, the computing device 120 connects directly to the furnace 105.

In one embodiment, furnace 105 includes a programmable controller that can load, store and execute process recipes. The programmable controller may control temperature settings, gas and/or vacuum settings, time settings, etc. of heat treat processes. The programmable controller may control a chamber heat up, may enable temperature to be ramped down as well as ramped up, may enable multi-step heat treating to be input as a single process, and so forth. The programmable controller may include a main memory (e.g., read-only memory (ROM), flash memory, dynamic random access memory (DRAM), static random access memory (SRAM), etc.), and/or a secondary memory (e.g., a data storage device such as a disk drive). The main memory and/or secondary memory may store instructions for performing heat treatment processes described herein.

The programmable controller may also include a processing device coupled to the main memory and/or secondary memory (e.g., via a bus) to execute the instructions. The processing device may be a general-purpose processing device such as a microprocessor, central processing unit, or the like. The processing device may also be a special-purpose processing device such as an application specific integrated circuit (ASIC), a field programmable gate array (FPGA), a digital signal processor (DSP), network processor, or the like. In one embodiment, programmable controller is a programmable logic controller (PLC).

In one embodiment, furnace 105 is programmed to execute a recipe that will cause the furnace 105 to heat treat a ceramic article using a heat treatment process described with reference to FIG. 1B.

Figure 1B:
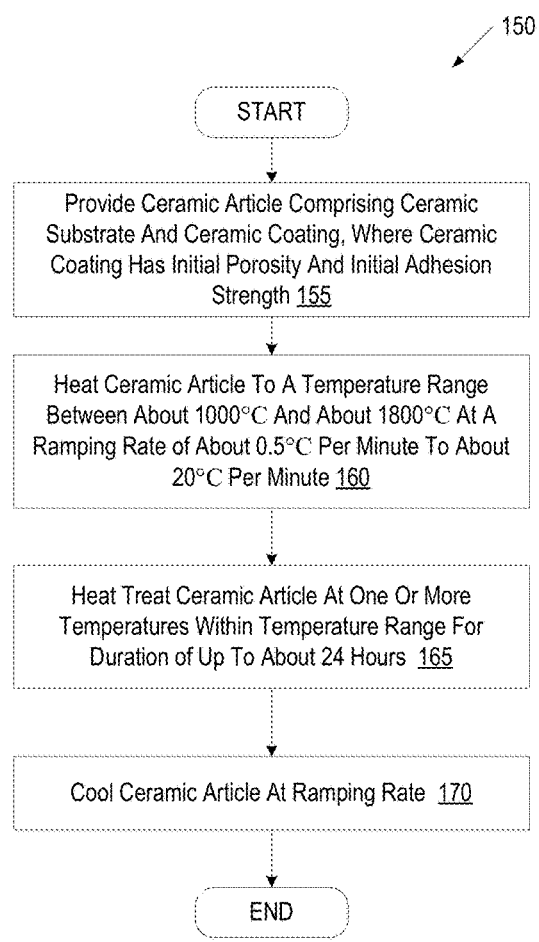
FIG. 1B illustrates a process for heat treating a ceramic article, in accordance with one embodiment of the present invention.

FIG. 1B is a flow chart showing a process 150 for heat treating a ceramic article, in accordance with one embodiment of the present invention. At block 155 of process 150, a ceramic article is provided (e.g., to a furnace or kiln). In one embodiment, the ceramic article is automatically loaded into a furnace by a loader. The ceramic article includes a ceramic substrate that has been coated on at least one surface with a ceramic coating. In one embodiment, the ceramic article is a ceramic lid, a ceramic nozzle, or another process chamber element for a plasma etcher or plasma cleaner. The ceramic article may have a yttria dominant ceramic coating. Yttria dominant ceramics may be used due to the superior plasma resistance properties of yttria oxides. The ceramic article may also have a ceramic substrate that has good mechanical properties such as a high flexural strength and resistance to cracking due to high temperatures and/or thermal stress.

The ceramic substrate may have been machined prior to being coated with the ceramic coating. Additionally, the ceramic coating may have been machined after having coated the ceramic substrate. Examples of machining include surface grinding, polishing, drilling, abrading, cutting, bead blasting, or otherwise processing with machine tools. In one embodiment, after the ceramic coating is formed over the ceramic substrate, the ceramic coating is polished. This may cause a large amount of particles, which may be trapped in cracks, pores and other surface defects of the ceramic coating.

The ceramic substrate may be formed from a bulk ceramic such as $Y_2O_3$, $Y_4Al_2O_9$, $Al_2O_3$, $Y_3Al_5O_{12}$ (YAG), Quartz, SiC, $Si_3N_4$, AlN, ZrO2, and so on. For example, the ceramic substrate may be a bulk sintered form of any of the ceramics described below with reference to the ceramic coating. The substrate may also be a ceramic composite such as an $Al_2O_3$—YAG ceramic composite or a SiC—$Si_3N_4$ ceramic composite. The ceramic substrate may also be a ceramic composite that includes a yttrium oxide (also known as yttria and $Y_2O_3$) containing solid solution. For example, the ceramic substrate may be a high performance material (HPM) that is composed of a compound $Y_4Al_2O_9$ (YAM) and a solid solution $Y_2$-$xZr_xO_3$ ($Y_2O_3$—$ZrO_2$ solid solution). Note that pure yttrium oxide as well as yttrium oxide containing solid solutions may be doped with one or more of $ZrO_2$, $Al_2O_3$, $SiO_2$, $B_2O_3$, $Er_2O_3$, $Nd_2O_3$, $Nb_2O_5$, $CeO_2$, $Sm_2O_3$, $Yb_2O_3$, or other oxides.

Similar to the ceramic substrate, the ceramic coating may be formed of $Y_2O_3$ (yttria), $Y_4Al_2O_9$ (YAM), $Al_2O_3$ (alumina), $Y_3Al_5O_{12}$ (YAG), Quartz, $YAlO_3$ (YAP), SiC (silicon carbide), $Si_3N_4$ (silicon nitride), AlN (aluminum nitride), $ZrO_2$ (zirconia), AlON (aluminum oxynitride), $TiO_2$ (titania), TiC (titanium carbide), ZrC (zirconium carbide), TiN (titanium nitride), TiCN (titanium carbon nitride), $Y_2O_3$ stabilized $ZrO_2$ (YSZ), and so on. Also similar to the ceramic substrate, the ceramic coating may be pure yttrium oxide or a yttrium oxide containing solid solution that may be doped with one or more of $ZrO_2$, $Al_2O_3$, $SiO_2$, $B_2O_3$, $Er_2O_3$, $Nd_2O_3$, $Nb_2O_5$, $CeO_2$, $Sm_2O_3$, $Yb_2O_3$, or other oxides. In one embodiment, the ceramic coating is the HPM composite. However, the ceramic coating is formed by spraying or growing the ceramic coating on the ceramic substrate, and the ceramic substrate may be formed by a sintering process.

In one embodiment, the ceramic coating is a yttrium oxide containing ceramic that has been deposited on the ceramic substrate using a thermal spraying technique or plasma sprayed technique. Thermal spraying techniques may melt materials (e.g., ceramic powders) and spray the melted materials onto the ceramic substrate. The thermally sprayed ceramic coating may have a thickness about 20 micrometers to about several millimeters.

In one embodiment, the ceramic coating is plasma sprayed onto the ceramic substrate. Alternatively, other thermal spraying techniques such as detonation spraying, wire arc spraying, high velocity oxygen fuel (HVOF) spraying, flame spraying, warm spraying and cold spraying may be used. Additionally, other coating processes such as aerosol deposition, electroplating, physical vapor deposition (PVD), ion assisted deposition (IAD) and chemical vapor deposition (CVD) may be used to form the ceramic coating. Notably, the ceramic coating process may produce a ceramic coating having small voids such as pores, cracks and regions of incomplete bonding. The ceramic coating may have structural properties that are significantly different from those of bulk ceramic materials (e.g., such as the ceramic substrate).

In one embodiment, the ceramic coating is produced from $Y_2O_3$ powder. Alternatively, the ceramic coating may be a HPM ceramic composite produced from a mixture of a $Y_2O_3$ powder, $ZrO_2$ powder and $Al_2O_3$ powder. In one embodiment, the HPM ceramic composite contains 77% $Y_2O_3$, 15% $ZrO_2$ and 8% $Al_2O_3$. In another embodiment, the HPM ceramic composite contains 63% $Y_2O_3$, 23% $ZrO_2$ and 14% $Al_2O_3$. In still another embodiment, the HPM ceramic composite contains 55% $Y_2O_3$, 20% $ZrO_2$ and 25% $Al_2O_3$. Relative percentages may be in molar ratios. For example, the HPM ceramic may contain 77 mol % $Y_2O_3$, 15 mol % $ZrO_2$ and 8 mol % $Al_2O_3$. Other distributions of these ceramic powders may also be used for the HPM material.

The ceramic coating may initially have a weak adhesion strength (e.g., around 3 mega pascals (MPa)). This may cause the ceramic coating to delaminate or peel off of the ceramic substrate after time (e.g., as a result of using the ceramic article in plasma rich processes). Additionally, the ceramic coating may have an initial porosity and an initial amount of cracking. These pores and cracks may enable process gasses and cleaning chemistries to penetrate the ceramic coating and react with the underlying ceramic substrate during processing. Such reactions may generate gasses, moisture or a different material under the ceramic coating, which may introduce blisters under the ceramic coating. These blisters may further cause the ceramic coating to separate from the ceramic substrate. Such separation may cause an elevated amount of particle contamination on processed material (e.g., processed wafers). Additionally, the blisters, cracks and pores (as well as other surface defects) may themselves cause particle contamination to processed substrates even in the absence of peeling.

In one example, pores, cracks, voids and other surface defects in the ceramic coating may include broken (or open) bonds that are high energy locations. These surface defects may trap particles. For example, the particles may form weak broken bonds with the ceramic article at the surface defect. During a plasma treatment, the plasma may break these weak broken bonds, and remove some of the particles from the ceramic coating. The ceramic particles may then be deposited on a processed substrate. Moreover, the plasma may break bonds of the ceramic article at the defect sites, at the pores, at the cracking, etc., which may erode the ceramic coating and cause additional particles to be created.

At block 160, the ceramic article is heated at a ramping rate of about 0.1° C. to about 20° C. per minute. Ceramic articles may be fragile, and may crack when exposed to extreme changes in temperature. Accordingly, a ramping rate that is slow enough to prevent the ceramic article from cracking is used. It is expected that for some ceramics a ramping rate of more than 20° C. per minute may be possible. Accordingly, in some embodiments, ramping rates beyond 20° C. per minute that do not cause cracking may be used.

The temperature changes that cause a ceramic article to crack may depend on the composition of the ceramic article. For example, $Al_2O_3$ may be heated at a rate of 10° C. per minute or more without cracking. However, $Y_2O_3$ may crack if heated at a ramping rate that is faster than about 5° C. per minute. In one embodiment, a ramping rate of about 0.1-5° C. per minute is used for ceramic coatings of $Y_2O_3$ and of the HPM ceramic composite. In a further embodiment, a ramping rate of about 5° C. per minute is used for ceramic coatings made up of $Y_2O_3$ and of the HPM ceramic composite. Typically, the ceramic article will start at or near ambient temperature, and will slowly be heated at the ramping rate to a predetermined temperature.

The ceramic article is heated until it reaches a specified temperature or temperature range. The specified temperature may range from about 1000° C. to about 1800° C. The specific temperature used may depend on the composition of the ceramic article or a specified target thickness for a transition layer. In one embodiment, a temperature of 1400-1500° C. is used for a ceramic article having an alumina substrate and an HPM ceramic coating or a yttria ($Y_2O_3$) ceramic coating.

At block 165, the ceramic article is heat treated at the specified temperature or at one or more temperatures within the temperature range for a duration of up to 24 hours. The specific duration used may depend on a composition of the ceramic article, as well as desired performance properties of the ceramic article. For example, the specific duration may depend on a target thickness for the transition layer.

As discussed above, the ceramic coating may have a high number of surface defects and particles that are trapped by these surface defects. The heat treatment may reduce or eliminate these defects and/or particles. Specifically, the heat treatment may cause the particles to melt and/or may cause a portion of the ceramic coating to melt at the surface defect regions. The melted particles may flow together with the ceramic coating at the surface defect regions. The melted particles may then redeposit onto the ceramic coating and form unbroken bonds with the ceramic coating at these surface defect regions. The resultant unbroken bonds are much stronger than the broken bonds that previously bound the particles to the ceramic coating. Thus, the particles become much less susceptible to being removed from the ceramic coating during a plasma etch process, and the defect regions become less susceptible to erosion.

Additionally, the ceramic coating typically has a relatively high porosity and a relatively high amount of cracking. The heat treatment may cause the pores and the cracks to shrink and/or be removed. The pores and cracks may shrink or be eliminated based on the same melting and re-depositing of the ceramic coating discussed above. For example, the ceramic coating at a pore or crack may melt and then redeposit, filling and/or healing the port or crack.

In one embodiment, the ceramic coating and the ceramic substrate react during the heat treatment process to form a transition layer. The transition layer may be formed if the ceramic coating and the ceramic substrate are composed of materials that will react when exposed to heat. For example, if the ceramic substrate is $Al_2O_3$, and the ceramic coating is the HPM ceramic composite, then the ceramic coating and ceramic substrate will react during the heat treatment to form a YAG transition layer. In another example, if the ceramic substrate is $Al_2O_3$, and the ceramic coating is $Y_2O_3$, then the ceramic coating and ceramic substrate may react during the heat treatment to form a YAG transition layer. Other combinations of ceramic coating materials and ceramic substrate materials will form other transition layers.

Notably, the transition layer may be a non-reactive and non-porous layer. Accordingly, during subsequent processing using a heat treated ceramic article, process gases may penetrate the ceramic coating, but may not penetrate the transition layer. Thus, the transition layer may prevent the process gasses from reacting with the ceramic substrate. This may minimize or prevent blistering, and may improve peeling performance and adhesion strength (bond strength)for the ceramic coating.

Though the transition layer has numerous beneficial effects, the transition layer may become problematic if the transition layer becomes too thick. Some transition layers will have different coefficients of expansion than the ceramic coating and/or ceramic substrate. Thus, if the transition layer is thicker than a threshold thickness (e.g., around 5 microns), then the transition layer may introduce cracking in the ceramic coating during subsequent processing. For example, the HPM ceramic composite and alumina have approximately equivalent coefficients of expansion, but a transition layer of YAG has a coefficient of expansion that is different from the HPM ceramic composite and alumina. Thus, expansion and contraction of the YAG transition layer may cause the ceramic coating to crack if the YAG transition layer is thicker than around 5 microns ($\mu$m).

The transition layer grows at a rate that is dependent upon temperature and time. As temperature and heat treatment duration increase, the thickness of the transition layer also increases. Accordingly, the temperature (or temperatures) and the duration used to heat treat the ceramic article should be chosen to form a transition layer that is not thicker than around 5 microns. In one embodiment, the temperature and duration are selected to cause a transition layer of about 0.1 microns to about 5 microns to be formed. In one embodiment, the transition layer has a minimum thickness that is sufficient to prevent gas from reacting with the ceramic substrate during processing (e.g., around 0.1 microns). In one embodiment, the transition layer has a target thickness of 1-2 microns.

The heat treatment also causes the grain size of the ceramic coating to increase. As the temperature and heat treatment duration increase, the grain size of the ceramic coating also increases. The increase of grain size leads to fewer grain boundaries. Grain boundaries are more easily eroded by plasma than the grains of ceramic. Therefore, this increase in grain size may cause the ceramic coating to be less prone to cause particle contamination during subsequent processing. Accordingly, a heat treatment temperature and duration may be chosen based on a target grain size for the ceramic coating.

For an alumina ceramic substrate and a ceramic coating of HPM or yttria, a heat treatment of 1500C with a heat treatment duration of about 3-6 hours may be performed. In one embodiment, the heat treatment duration is about 4 hours for a ceramic coating of yttria or the HPM ceramic composite.

In one embodiment, the ceramic article is maintained at a single temperature for the duration of the heat treatment. Alternatively, the ceramic article may be heated and/or cooled to multiple different temperatures within the temperature range during the heat treatment. For example, the ceramic article may be heat treated at a temperature of 1500° C. for 4 hours, may then be heat treated to a temperature of 1700° C. for another 2 hours, and may then be heat treated at 1000° C. for another three hours. Note that when multiple different heat treatment temperatures are used, the ceramic article may be heated and/or cooled at the ramping rate to transition between heat treatment temperatures.

At block 170, the ceramic article is cooled at the ramping rate. In one embodiment, the ceramic article is cooled at the same ramping rate as the ramping rate used to heat the ceramic article. In another embodiment, a different ramping rate is used to cool the ceramic article than was used to heat the ceramic article. The ceramic coating of the resultant heat treated ceramic article may have improved performance with regards to particle contamination of processed substrates, plasma erosion resistance, adhesion strength, porosity, amount and size of cracks, and peeling resistance. Additionally, the resultant heat treated ceramic article may have a transition layer between the ceramic coating and the ceramic substrate. Thus, ceramic lids, ceramic nozzles, process kit, and other ceramic internal process chamber components may be heat treated using process 150 to improve yield of manufactured products. Moreover, ceramic articles to which process 150 is applied may have a reduced replacement frequency, and may reduce apparatus down time.

Note that process 150 may be performed as part of a manufacturing process for ceramic articles after a ceramic coating has been formed on a ceramic substrate. Additionally, process 150 may be periodically performed on used ceramic articles to heal or repair those ceramic articles. For example, a ceramic article may be heat treated using process 150 before use, and may then be heat treated using process 150 every few months, once a year, twice a year, or at some other frequency. The frequency with which to perform process 150 may depend on plasma etch and/or plasma clean recipes that are used with the ceramic article. For example, if the ceramic article is frequently exposed to particularly harsh plasma environments, then the ceramic article may be heat treated at an increased frequency.

Exposure to plasma may cause the ceramic coating to erode and/or corrode over time. For example, the plasma may cause broken bonds to occur at the surface of the ceramic coating, may generate ceramic particles that can contaminate processed substrates, may cause defects at the surface of the ceramic coating, may cause the ceramic coating to peel away from the ceramic substrate, and so on. Accordingly, as a ceramic article ages, the more particle contamination it is likely to cause. The heat treatment process 150 may be performed on such aged ceramic articles to reverse damage caused by the corrosive plasma environment. The heat treatment may heal defects and reduce particles for used ceramic articles in addition to newly manufactured ceramic articles. Accordingly, process 150 may be performed on used ceramic articles to prolong their useful life.

Note that in addition to healing surface defects and minimizing particles, the heat treatment process 150 may also be used to dry clean ceramic articles. Exposure to plasma environments may cause polymers to form on a surface of the ceramic article. These polymers may cause particle contamination on substrates during subsequent processing. Often, a periodic wet clean procedure is performed to remove the polymers from the ceramic article. In one embodiment, heat treatment process 150 is performed instead of a wet clean process. The heat treatment process 150 may cause the polymers that coat the ceramic article to react with air or another gas in a high temperature environment. This reaction may cause the polymer to become gaseous, and to leave the surface of the ceramic article. Therefore, the heat treatment process 150 can be used both to clean the ceramic article and to repair a surface of the ceramic article. Note that the temperature and/or duration used for subsequent heat treatment processes may be different from a temperature and/or duration used for an initial heat treatment process.

Figure 2A:
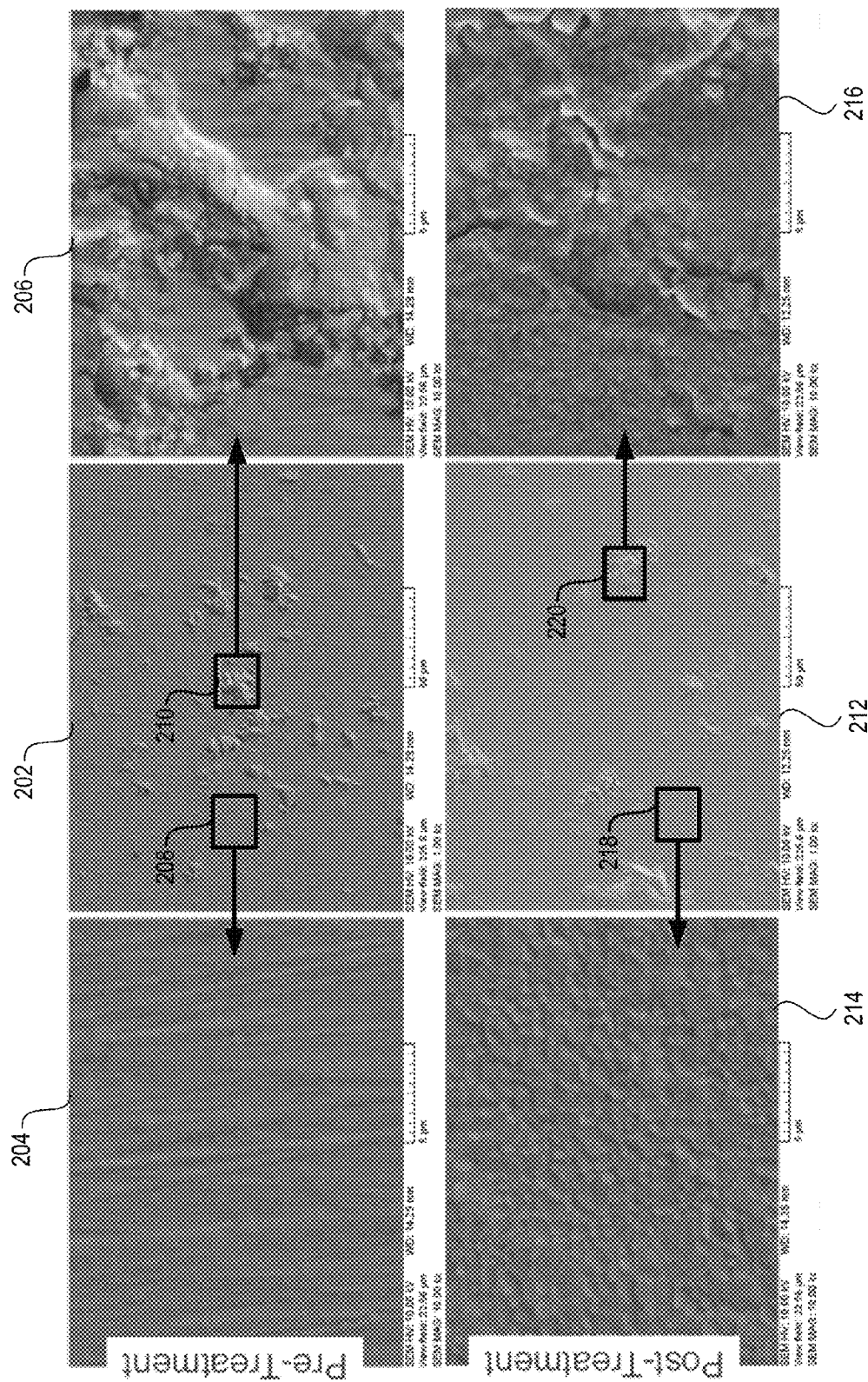
FIG. 2A shows micrographs of a ceramic coating's surface before the ceramic coating is processed using a heat treatment, and after the ceramic coating has been processed using the heat treatment, in accordance with embodiments of the present invention.

FIG. 2A shows micrographs 202-216 of a ceramic coating before the ceramic coating is processed using a heat treatment, and after the ceramic article has been processed using the heat treatment, in accordance with embodiments of the present invention. The ceramic coating shown in micrographs 202-216 is a HPM ceramic composite having $Y_4Al_2O_9$ and $Y_2$-$xZr_xO_3$.

Micrograph 202 shows a sample of the ceramic article prior to heat treatment. Micrograph 204 shows a zoomed in view of a region 208 shown in micrograph 202. Region 208 is relatively free from surface defects. Micrograph 204 illustrates a grain size of the ceramic coating. Micrograph 206 shows a zoomed in view of region 210 shown in micrograph 202. Region 210 illustrates surface defects and surface particles of the ceramic coating.

Micrograph 212 shows the sample of micrograph 202 after a heat treatment. As illustrated, an amount of surface defects has been reduced as a result of the heat treatment. Micrograph 214 shows a zoomed in view of a region 218 shown in micrograph 212. Region 218 is relatively free from surface defects and surface particles. Micrograph 214 illustrates a grain size of the ceramic coating that is larger than the grain size shown in micrograph 204. Micrograph 216 shows a zoomed in view of region 220 shown in micrograph 212. Region 220 illustrates surface defects of the ceramic coating. However, the surface defects shown in micrograph 216 are less severe than the surface defects shown in micrograph 206, and surface particles have been substantially removed.

Figure 2B:
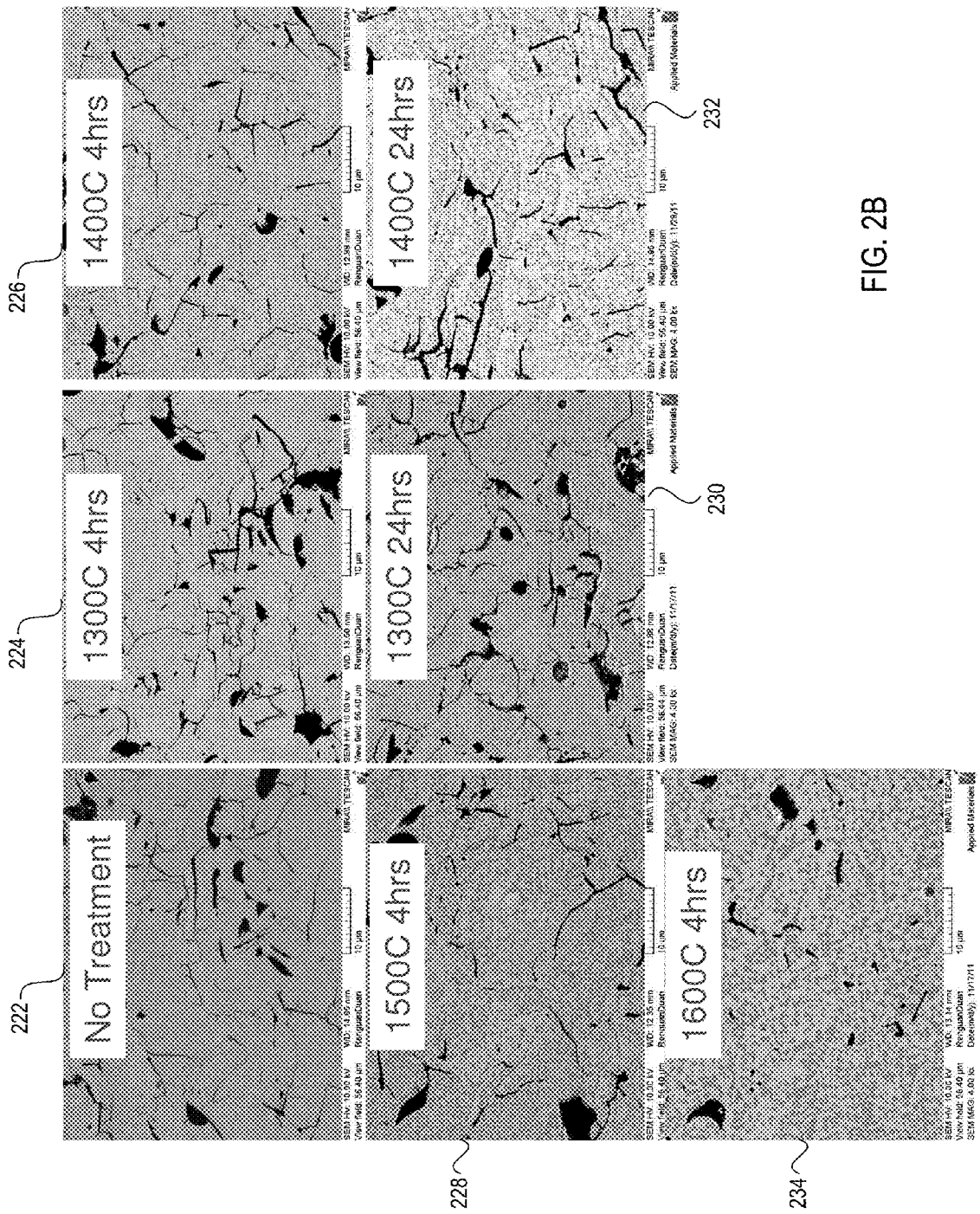
FIG. 2B shows additional micrographs of a ceramic coating's surface at a 4,000-fold magnification before the ceramic coating is processed using a heat treatment, and after the ceramic coating has been processed using heat treatments at various temperatures and treatment durations, in accordance with embodiments of the present invention.

FIG. 2B shows additional micrographs 222-234 of a ceramic coating's surface at a 4,000-fold magnification before the ceramic coating is processed using a heat treatment, and after the ceramic coating has been processed using heat treatments at various temperatures and treatment durations, in accordance with embodiments of the present invention. Micrograph 222 shows a sample of the ceramic coating prior to heat treatment. Micrograph 224 shows a sample of the ceramic coating after a four hour heat treatment at a temperature of 1300° C. Micrograph 226 shows a sample of the ceramic coating after a four hour heat treatment at 1400° C. Micrograph 228 shows a sample of the ceramic coating after a four hour heat treatment at 1500° C. Micrograph 234 shows a sample of the ceramic coating after a four hour heat treatment at a temperature of 1600° C. As shown, increases in the temperature with a fixed heat treatment time cause a size and number of cracks to be reduced. Additionally, increases in the temperature cause a size and number of pores to be reduced (thus reducing porosity).

Micrograph 230 shows a sample of the ceramic coating after a twenty four hour heat treatment at a temperature of 1300° C. Micrograph 232 shows a sample of the ceramic coating after a twenty four hour heat treatment at a temperature of 1400° C. As shown, heat treating the ceramic coating over four hours did not significantly further reduce porosity or an amount of cracking. Accordingly, in one embodiment the heat treatment duration is approximately four hours.

Figure 2C:
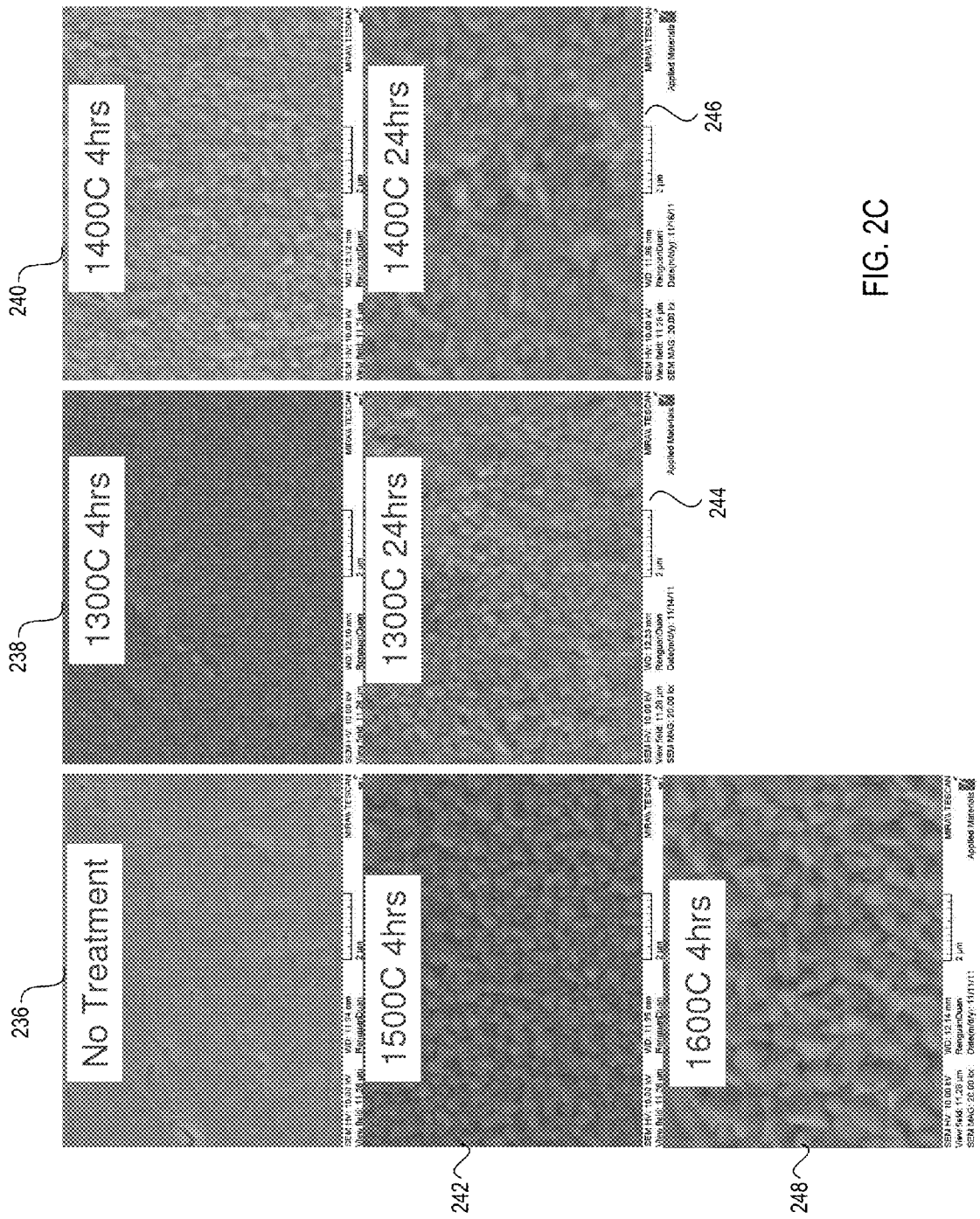
FIG. 2C shows additional micrographs of a ceramic coating's surface at a 20,000-fold magnification before the ceramic coating is processed, and after the ceramic coating has been processed using heat treatments of various temperatures and treatment durations, in accordance with embodiments of the present invention.

FIG. 2C shows additional micrographs 236-248 of a ceramic coating's surface at a 20,000-fold magnification before the ceramic coating is processed, and after the ceramic coating has been processed using heat treatments of various temperatures and treatment durations, in accordance with embodiments of the present invention. Micrograph 236 shows a ceramic coating before heat treatment. Micrograph 238 shows a ceramic coating after a 4 hour heat treatment at 1300° C. Micrograph 240 shows the ceramic coating after a 4 hour heat treatment at 1400° C. Micrograph 242 shows the ceramic coating after a 4 hour heat treatment at 1500° C. Micrograph 248 shows the ceramic coating after a 4 hour heat treatment at 1600° C. The grain size shown in micrograph 248 is larger than the grain size shown in micrograph 242, which is larger than the grain size shown in micrograph 240, and so on. Thus, increases in heat treatment temperature cause an increase in grain size for the ceramic coating.

Micrograph 244 shows a ceramic coating after a 24 hour heat treatment at 1300° C. Micrograph 246 shows a ceramic coating after a 24 hour heat treatment at 1400° C. Thus, increases in heat treatment duration also cause an increase in grain size for the ceramic coating. The ceramic coating's grain size may initially be nano-sized prior to heat treatment, and may eventually grow larger than nano-sized due to the heat treatment. A temperature and/or duration for the heat treatment may be selected based on target grain size. Increasing the treatment duration may result in a non-uniform grain size, as shown in micrographs 244 and 246.

Figure 2D:
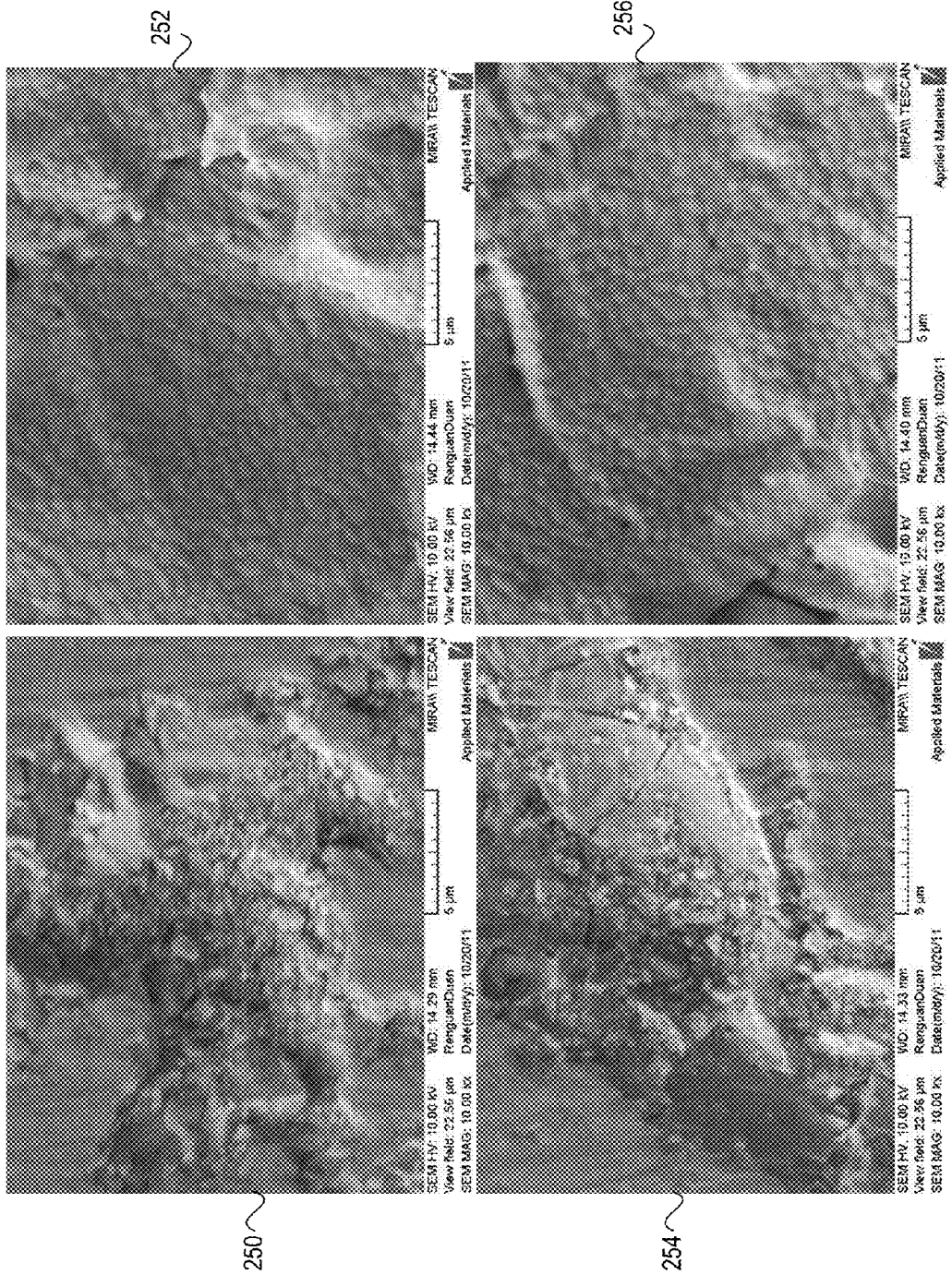
FIG. 2D shows additional micrographs of a ceramic coating's surface at a 10,000-fold magnification before the ceramic coating is processed, and after the ceramic coating has been processed, in accordance with embodiments of the present invention.

FIG. 2D shows additional micrographs 250-256 of a ceramic coating's surface at a 10,000-fold magnification before the ceramic coating is processed, and after the ceramic coating has been processed, in accordance with embodiments of the present invention. Micrographs 250 and 254 show that prior to the heat treatment, the ceramic coating includes a high number of ceramic particles. Micrographs 252 and 256 show that after the heat treatment, the ceramic particles are reduced or eliminated. In one embodiment, surface particle count may be reduced by as much as about 93%.

Figure 3A:
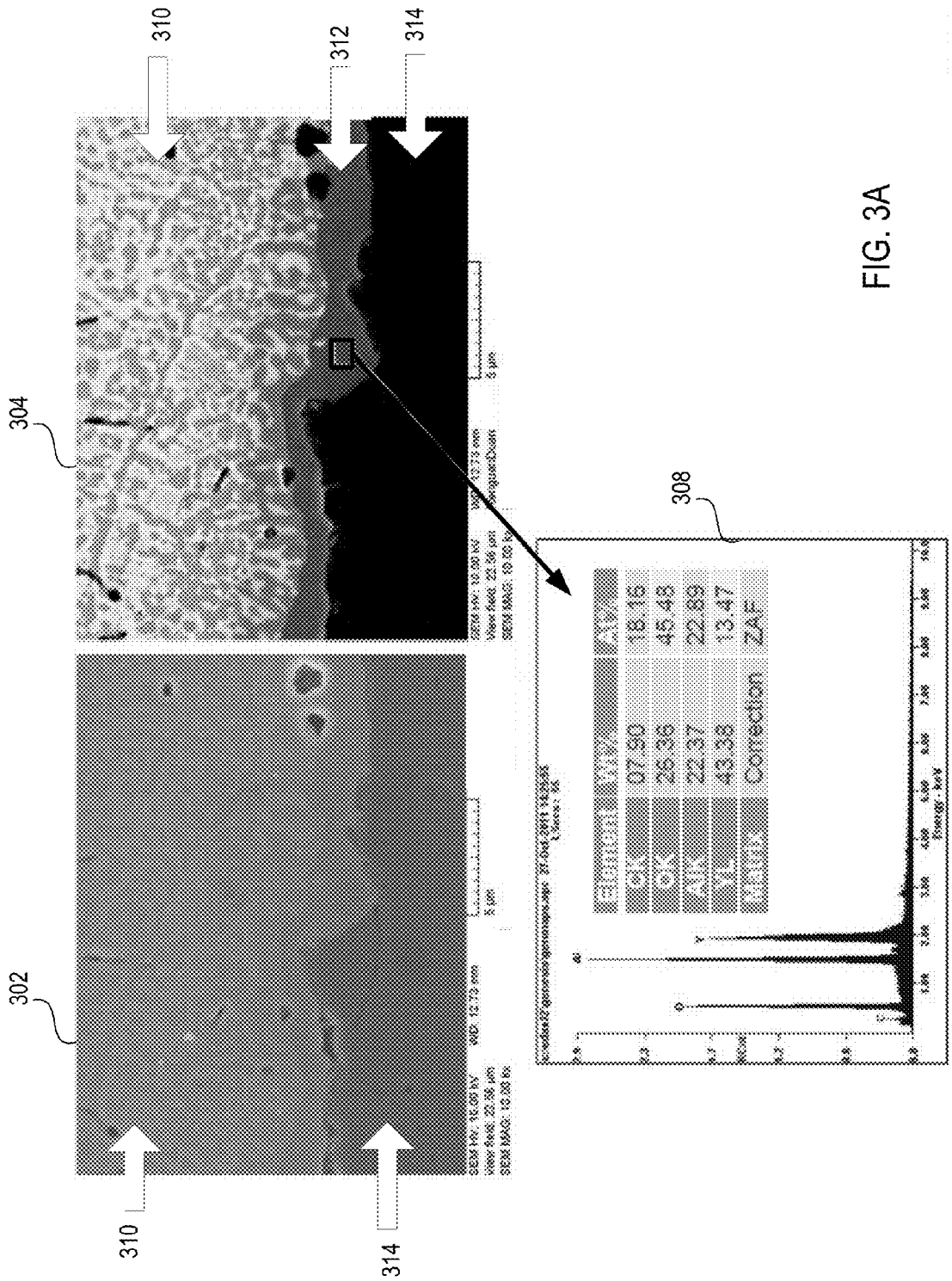
FIG. 3A illustrates micrographs showing a cross sectional side view of a ceramic article before and after heat treatment, in accordance with one embodiment of the present invention.

FIG. 3A illustrates micrographs 302-304 showing a cross sectional side view of a ceramic article before and after heat treatment, in accordance with one embodiment of the present invention. Micrograph 302 shows that the ceramic article includes a ceramic substrate 314 and a ceramic coating 310 over the ceramic substrate 314. The illustrated ceramic substrate 314 is alumina and the illustrated ceramic coating 310 is the HPM ceramic composite.

Micrograph 304 shows the ceramic substrate 314 and ceramic coating 310 along with a transition layer 312 that has been formed between the ceramic coating 310 and the ceramic substrate 314. The illustrated transition layer has a thickness of about 1-2 microns.

An elemental map 308 of the transition layer is also shown. The elemental map 308 may provide an elemental analysis of the transition layer 312 based on energy dispersive X-ray spectroscopy (EDX). The elemental map 308 shows that the transition layer 312 is composed of carbon, oxygen, aluminum and yttrium. The elemental map 308 further shows that the atomic concentrations of the elements in the transition layer 312 are roughly 18% carbon, 46% oxygen, 23% aluminum and 13% yttrium. Thus, the transition layer 312 is shown to be $Y_3Al_5O_{12}$ (YAG). The transition layer may significantly improve the adhesion strength of the ceramic coating to the ceramic substrate.

Figure 3B:
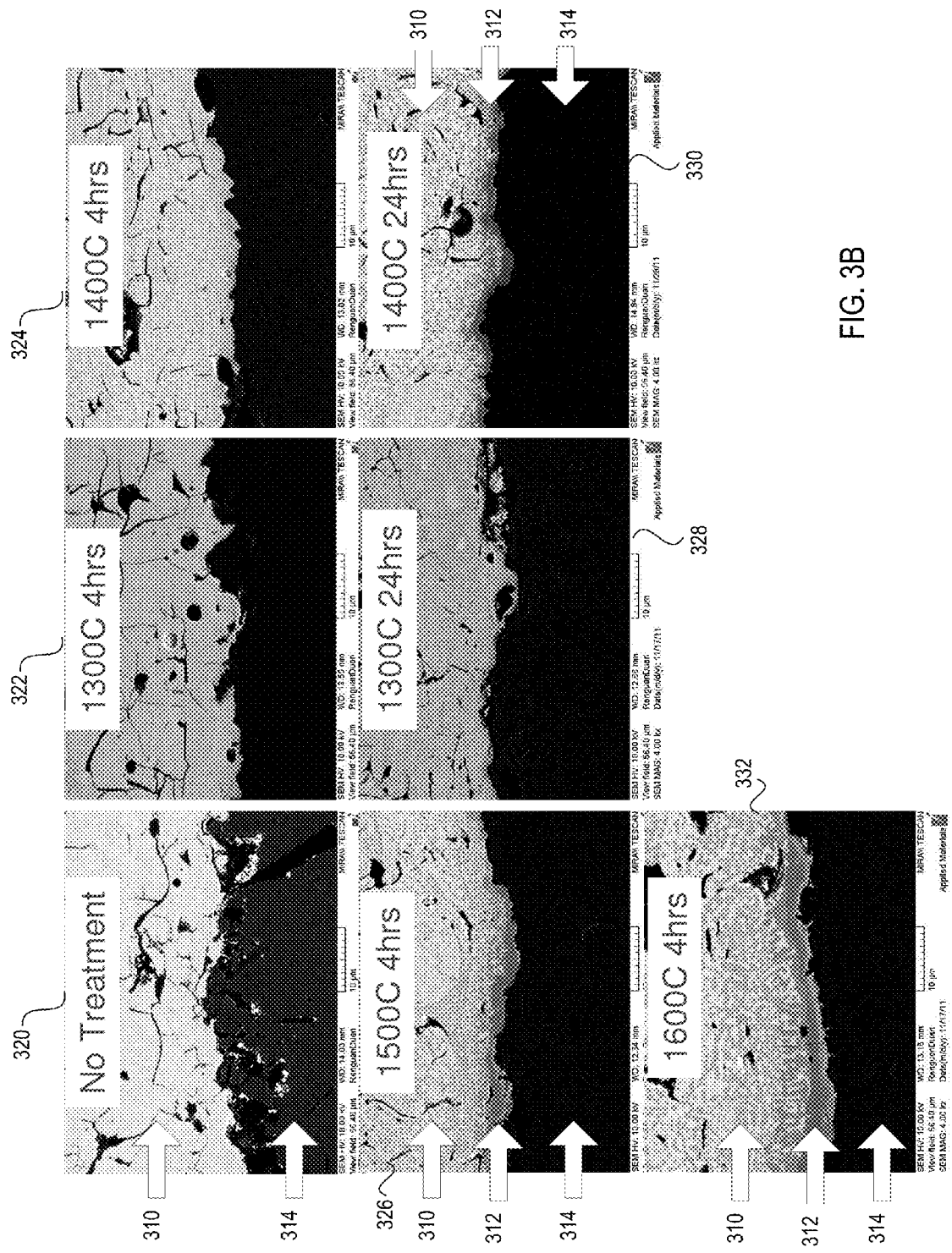
FIG. 3B illustrates micrographs showing cross sectional side views of a ceramic article at a 4,000-fold magnification before and after heat treatment at various temperatures and treatment durations, in accordance with embodiments of the present invention.

FIG. 3B illustrates micrographs showing cross sectional side views of a ceramic article at a 4,000-fold magnification before and after heat treatment at various temperatures and treatment durations, in accordance with embodiments of the present invention. Micrograph 320 shows an interface between a ceramic coating 310 and a ceramic substrate 314 before heat treatment. Micrograph 322 shows an interface between the ceramic coating 310 and the ceramic substrate 314 after a 4 hour heat treatment at 1300° C. Micrograph 324 shows an interface between the ceramic coating 310 and the ceramic substrate 314 after a 4 hour heat treatment at 1400° C. Micrograph 326 shows an interface between the ceramic coating 310 and the ceramic substrate 314 after a 4 hour heat treatment at 1500° C. Micrograph 332 shows an interface between the ceramic coating 310 and the ceramic substrate 314 after a 4 hour heat treatment at 1600° C. Micrograph 328 shows an interface between the ceramic coating 310 and the ceramic substrate 314 after a 24 hour heat treatment at 1300° C. Micrograph 330 shows an interface between the ceramic coating 310 and the ceramic substrate 314 after a 24 hour heat treatment at 1300° C.

As shown in micrographs 326, 330 and 332, a transition layer 312 forms between the ceramic coating 310 and the ceramic substrate 314 during the heat treatment under certain conditions. At a heat treatment temperature of 1300° C., no transition layer may be formed, regardless of the heat treatment duration. At a heat treatment temperature of 1400° C., no transition layer may be detectable after 4 hours of processing, but a transition layer 312 may be detectable after 24 hours of processing. At heat treatment temperatures of 1500° C. and 1600° C., transition layer 312 may be detectable after 4 hours of processing.

A thicker transition layer is shown to be formed for increased treatment temperatures and for increased treatment durations. Temperature may have a greater impact on transition layer thickness than duration. As shown, a heat treatment with a duration of 4 hours and a temperature of 1500° C. may produce a transition layer 312 having a thickness that is slightly thicker than a transition layer 312 produced by a heat treatment with a duration of 24 hours and a temperature of 1400° C.

Figure 3C:
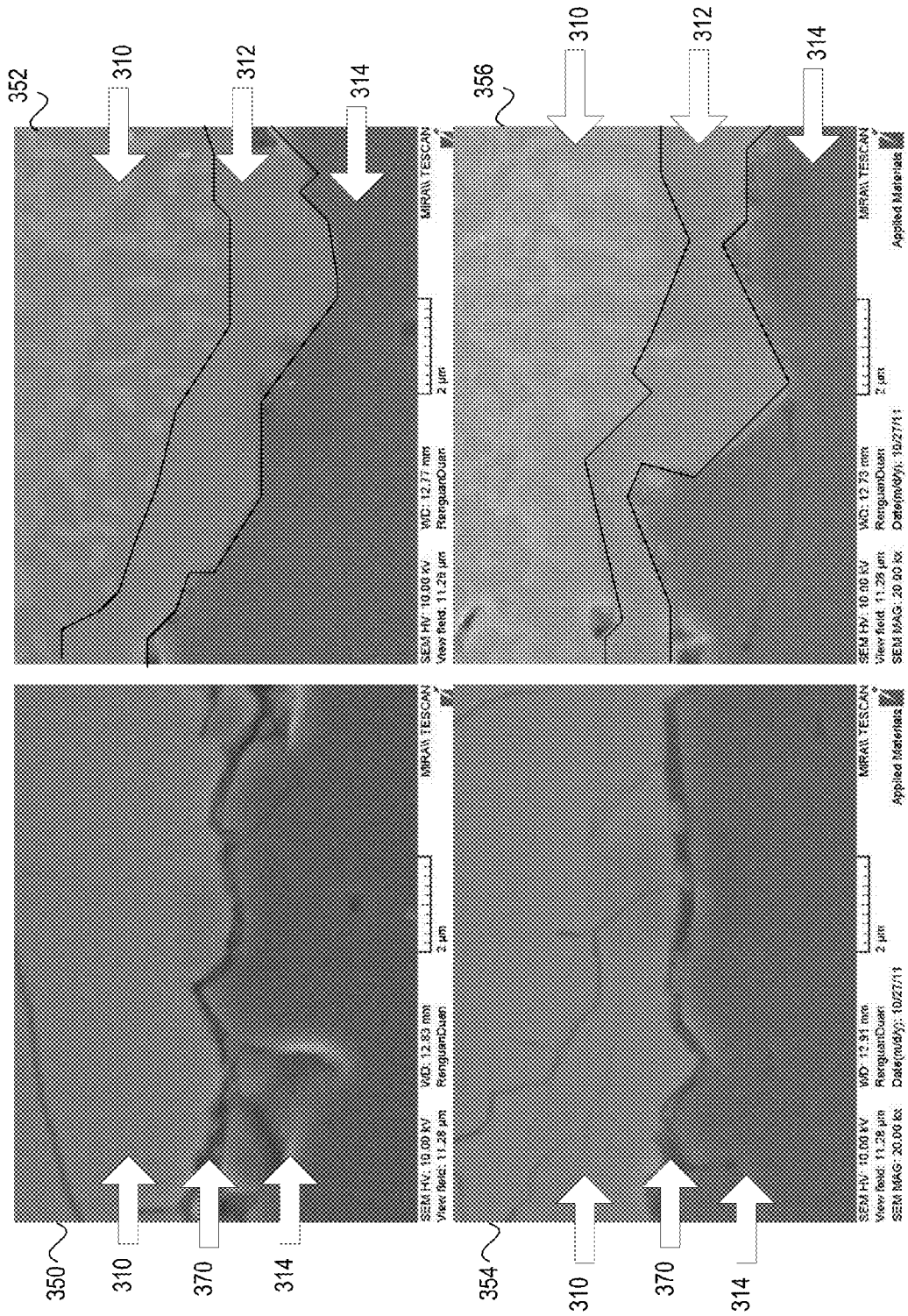
FIG. 3C illustrates micrographs showing cross sectional side views of a ceramic article at a 20,000-fold magnification before and after heat treatment, in accordance with embodiments of the present invention.

FIG. 3C illustrates micrographs 350-356 showing cross sectional side views of a ceramic article at a 20,000-fold magnification before and after heat treatment, in accordance with embodiments of the present invention. Micrographs 350 and 354 show an interface between the ceramic coating 310 and the ceramic substrate 314 prior to heat treatment. Gaps 370 are shown between the ceramic substrate 314 and the ceramic coating 310 prior to the heat treatment. These gaps may contribute to future delamination of the ceramic coating 310 from the ceramic substrate 314. Micrographs 352 and 356 show that a transition layer 312 forms at the interface between the ceramic coating 310 and the ceramic substrate 314 during heat treatment. Additionally, micrographs 352 and 356 show that the gaps 370 present prior to heat treatment are eliminated or reduced as a result of heat treatment. This may reduce a likelihood of delamination, and may improve an adhesion or bond strength of the ceramic coating 310 to the ceramic substrate 314.

Figure 3D:
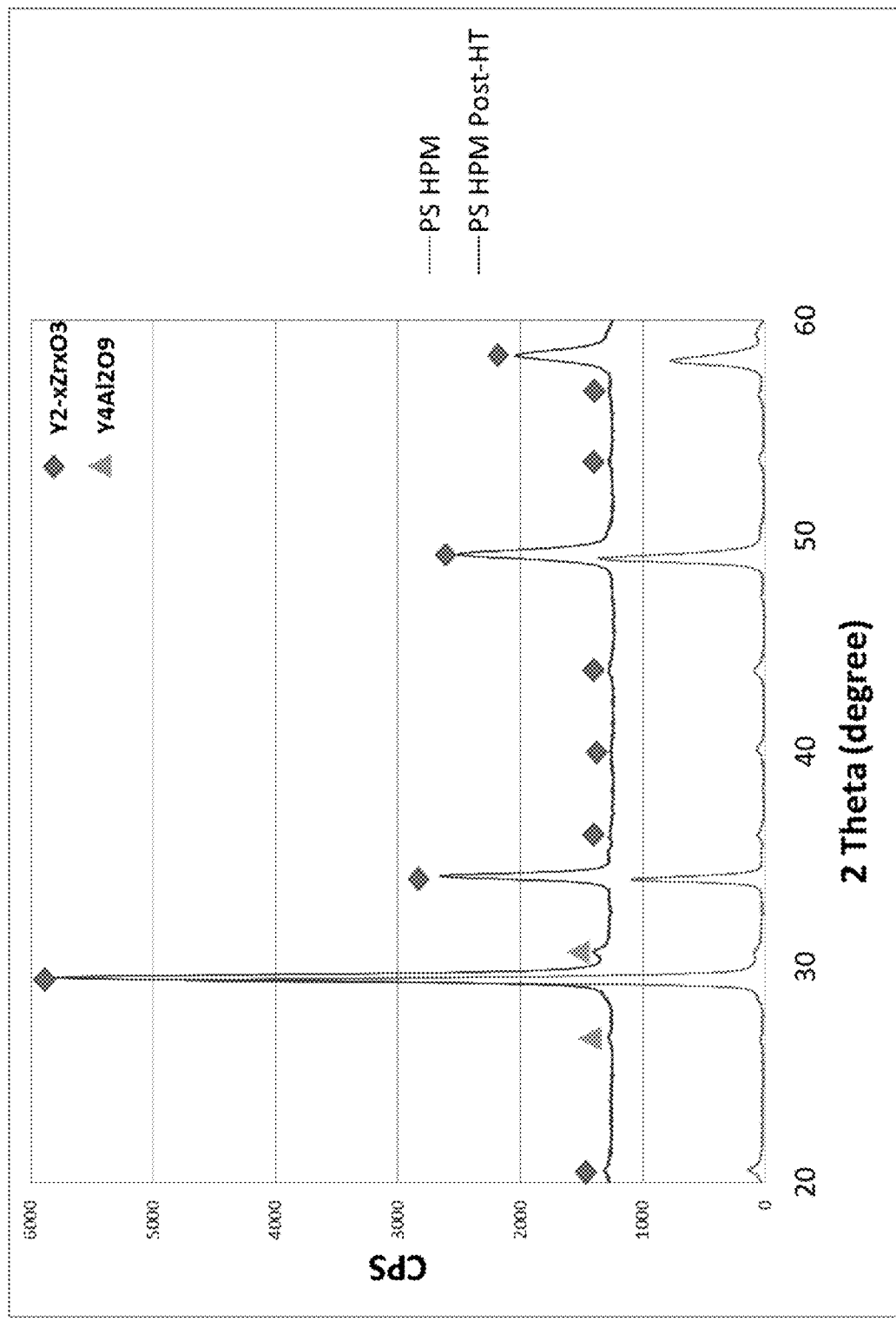
FIG. 3D illustrates a phase composition comparison of an HPM ceramic composite coating before and after heat treatment, in accordance with one embodiment of the present invention.

FIG. 3D illustrates a phase composition comparison of an HPM ceramic composite coating before and after heat treatment, in accordance with one embodiment of the present invention. As shown, the thermal treatment did not significantly change a phase composition of the ceramic coating or the ceramic substrate.

Surface morphology of the ceramic coating may be represented using surface roughness parameters and/or surface uniformity parameters. The surface morphology may also be represented using porosity, cracking and/or void parameters. Measured parameters that represent porosity may include a pore count and/or an average pore size. Similarly, measured parameters that represent voids and/or cracking may include an average void/crack size and/or a void/crack count.

Measured parameters that represent particle count are a tape peel test particle count and a liquid particle count (LPC). The tape test may be performed by attaching an adhesive tape to the ceramic coating, peeling the tape off, and counting a number of particles that adhere to the tape. The LPC may be determined by placing the ceramic article in a water bath (e.g., a de-ionized (DI) water bath) and sonicating the water bath. A number of particles that come off in the solution may then be counted using, for example, a laser counter.

Adhesion strength may be determined by applying a force (e.g., measured in mega pascals) to the ceramic coating until the ceramic coating peels off from the ceramic substrate. In one embodiment, the adhesion strength for the ceramic coating is on the order of 4 Mega pascals (MPa) before the heat treatment and on the order of 12 MPa after the heat treatment. Thus, the adhesion strength of the ceramic coating to the ceramic substrate after the heat treatment may be about three times stronger than the adhesion strength prior to the heat treatment.

Adhesion strength, porosity, cracking and particle count values for the ceramic coating may improve as a result of the heat treatment. Additionally, grain size may increase and hardness may decrease as a result of the heat treatment. Empirical evidence also shows that the amount of particle contamination caused during plasma etch processes by ceramic coated lids and ceramic coated nozzles is decreased as a result of the heat treatment. Empirical evidence also shows that peeling of the ceramic coating from the ceramic substrate is reduced as a result of the heat treatment. Additionally, surface roughness of the ceramic coating is reduced as a result of the heat treatment.

Note that for heat treatments of up to about 1200° C., the interaction between particles and a surface of the ceramic coating may be dominated by a van der Waals force, according to the following equation:

$$F = \frac{A}{12\pi H^2} \quad \text{(equation 1)}$$

where F is force, A is area and H is distance. As the heat treatment temperature increases from room temperature to about 500° C., the van der Waals force may weaken, and thermal expansion may induce an increase in the distance H. As the heat treatment temperature increases from 500° C. to about 1200° C., the van der Waals force may strengthen due at least in part to decreases in the distance H. Such reductions in distance may be due to the substrate surface absorbing particles and/or deformations.

At temperatures between about 1200° C. and 1800° C., a liquid film may be formed between particles and the ceramic coating surface. Between about 1200° C. and 1500° C., the liquid film may be a thin liquid film, and between about 1500° C. and 1800° C., the liquid film may be a thick liquid film. At temperatures up to about 1800° C., the interaction between the particles and the ceramic coating's surface may be dominated by interaction through the liquid by a capillary force, according to the following equation:

$$F = 4\pi\gamma R \cos\theta \quad \text{(equation 2)}$$

where F is force, $\gamma$ is liquid-air surface tension, R is effective radius of the interface between the particles and substrate surface, and $\theta$ is contact angle. At these temperatures, particles may be diffused into the liquid, and may be re-grown on a corresponding grain. This may cause particles to be removed from the substrate surface, even after the ceramic article has cooled.

For the HPM ceramic composite and yttria, 1800° C. is the sintering temperature. Accordingly, at temperatures at or above around 1800° C., a liquid phase is formed in the ceramic coating between powders. These powders may melt into liquid and grow into grains of increasing size. Atoms may be diffused from high energy grains to low energy grains until an equilibrium is reached. Accordingly, in one embodiment, the heat treatment is performed at temperatures below about 1800° C.

The preceding description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
    performing a thermal spraying process to form a ceramic coating comprising $Y_4Al_2O_9$ and solid solution of $Y_2O_3$—$ZrO_2$ on a ceramic substrate comprising $Al_2O_3$, wherein the ceramic coating has an initial porosity and an initial amount of cracking;
    heating a ceramic article comprising the ceramic substrate and the ceramic coating to a temperature range between about 1000° C. and about 1800° C. at a ramping rate of about 0.1° C. per minute to about 20° C. per minute;
    heat treating the ceramic article at one or more temperatures within the temperature range for a duration of up to about 24 hours to reduce a porosity and an amount of cracking of the ceramic coating, wherein the ceramic article is heat treated at below a sintering temperature for the ceramic coating to prevent sintering of the ceramic coating, and wherein the heat treating causes the ceramic coating comprising $Y_4Al_2O_9$ and the solid solution of $Y_2O_3$—$ZrO_2$ to react with the ceramic substrate comprising $Al_2O_3$ to form a transition layer between the ceramic substrate and the ceramic coating, the transition layer comprising $Y_3Al_5O_{12}$; and
    cooling the ceramic article at the ramping rate after the heat treatment.

2. The method of claim 1, wherein the ceramic coating additionally has an initial particle count and an initial adhesion strength, and wherein after the heat treatment the ceramic coating has a reduced particle count and an increased adhesion strength.

3. The method of claim 1, wherein the duration and the temperature range are selected to cause the transition layer to have a thickness of about 1 microns to about 2 microns.

4. The method of claim 1, further comprising:
    after the ceramic article has been used in a plasma etch process, repeating the heating, the heat treating and the cooling to reduce an increased surface defect density caused by the plasma etch process.

5. The method of claim 4, wherein the plasma etch process causes polymers to form on the ceramic article, and wherein repeating the heat treating in the presence of oxygen dry cleans the ceramic article by causing said polymers to react with the oxygen to become gases.

6. The method of claim 1, wherein the method is performed in at least one of a vacuum, the presence of air, the presence of Ar or the presence of $N_2$.

7. The method of claim 1, wherein the ceramic article is a process chamber component for a plasma etcher.

8. The method of claim 1, wherein the heat treating causes a grain size of the ceramic coating to increase, and wherein the duration and the temperature range are selected so that a target grain size is reached.

9. A method comprising:
    receiving a heat treated ceramic article comprising a ceramic substrate and a ceramic coating that has been used in a plasma etch process, wherein the ceramic coating has an initial surface defect density caused by the plasma etch process;
    heating the ceramic article to a temperature range between about 1000° C. and about 1800° C. at a ramping rate of about 0.1° C. per minute to about 20° C. per minute;
    heat treating the ceramic article at one or more temperatures within the temperature range for a duration of up to about 24 hours to reduce a porosity and an amount of cracking of the ceramic coating; and
    cooling the ceramic article at the ramping rate after the heat treatment, wherein after completing the heat treating the heat treated ceramic article has a new surface defect density level below the surface defect density level caused by the plasma etch process.

10. The method of claim 9, wherein the ceramic substrate and the ceramic coating each consists essentially of at least one of $Y_2O_3$, $Al_2O_3$, $Y_4Al_2O_9$, $Y_3Al_5O_{12}$ (YAG), Quartz, SiC $Si_3N_4$, AlN or SiC—$Si_3N_4$, and wherein the ceramic substrate has a different composition than the ceramic coating.

11. The method of claim 9, wherein the heat treated ceramic article further comprises a transition layer between the ceramic coating and the ceramic substrate.

12. The method of claim 9, wherein the ceramic coating consists of a solid solution comprising $Y_2O_3$ and at least one of $ZrO_2$, $Al_2O_3$, $SiO_2$, $B_2O_3$, $Er_2O_3$, $Nd_2O_3$, $Nb_2O_5$, $CeO_2$, $Sm_2O_3$ or $Yb_2O_3$.

13. The method of claim 9, wherein the plasma etch process causes polymers to form on the heat treated ceramic article, and wherein repeating the heat treating in the presence of oxygen dry cleans the ceramic article by causing said polymers to react with the oxygen to become gases.

14. The method of claim 9, wherein the method is performed in at least one of a vacuum, the presence of air, the presence of Ar or the presence of $N_2$.

15. The method of claim 9, wherein the heat treated ceramic article is a process chamber component for a plasma etcher.

* * * * *